United States Patent [19]

Azzaroni

[11] Patent Number: 4,539,794
[45] Date of Patent: Sep. 10, 1985

[54] AUTOMATIC MACHINE FOR UNLOADING AND RELOADING FILMS FROM AND INTO X RAY CASSETTES

[76] Inventor: Cesare Azzaroni, Via Toscana, 51, 40141 Bologna, Italy

[21] Appl. No.: 383,694

[22] Filed: Jun. 1, 1982

[30] Foreign Application Priority Data

Jun. 26, 1981 [IT] Italy ................... 3468 A/81

[51] Int. Cl.³ .............................. B65B 5/10
[52] U.S. Cl. ............................ 53/493; 53/504; 53/76; 53/238; 53/244; 53/382; 53/266 R; 414/411; 271/303; 193/2 C
[58] Field of Search .............. 53/266 C, 244, 237, 53/238, 249, 504, 67, 75, 381 R, 382, 76, 540, 493; 221/23.1; 414/411, 404; 271/9, 303, 238, 240; 193/2 C

[56] References Cited

U.S. PATENT DOCUMENTS

| | | | |
|---|---|---|---|
| 695,329 | 3/1902 | McCabe | 193/2 C |
| 3,150,263 | 9/1964 | Catlin | 53/266 C |
| 3,389,905 | 6/1968 | Boggs | 271/240 |
| 3,476,382 | 11/1969 | Tregay | 271/240 |
| 3,589,710 | 6/1971 | Yagi | 271/171 X |
| 3,997,263 | 12/1976 | Stemmle | 271/303 X |
| 4,049,142 | 9/1977 | Azzaroni | 414/411 X |
| 4,227,089 | 10/1980 | Plesser et al. | 53/266 C |
| 4,246,739 | 1/1981 | Rogerson | 53/504 X |

Primary Examiner—Horace M. Culver
Attorney, Agent, or Firm—Darby & Darby

[57] ABSTRACT

X ray films are withdrawn from a drawer type magazine positioned above an X ray film cassette unloading station. The films drop down freely from the magazine through a hopper and towards the said X ray cassette. The hopper comprises two substantially U shaped guide elements, one placed opposite the other in such a way as to form two channels along which slide the edges of the two opposite sides of each individual film. One of the elements is fixed, while the other is supported in a sliding fashion by the frame of the machine. The sliding element is able to undergo, in the direction of the fixed guide element, a two way displacement, and is connected to a pusher device provided on the machine for positioning the X ray cassette inserted into the unloading station, up against an abutment member located on the same side of the machine as the fixed guide element.

12 Claims, 7 Drawing Figures

AUTOMATIC MACHINE FOR UNLOADING AND RELOADING FILMS FROM AND INTO X RAY CASSETTES

BACKGROUND OF THE INVENTION

The invention relates to an improved automatic machine for unloading and reloading films from and into X ray cassettes, where it is necessary to remove an exposed film from the cassette and to place therein a new film.

DESCRIPTION OF THE PRIOR ART

For the execution of these operations use is presently made of machines by means of which the opening of the cassette containing the exposed film, the removal of the film from the cassette and the despatch of the film to a developing apparatus, the withdrawal of a new film of a suitable format from a magazine and the arranging thereof in the open cassette, as well as the closing of the reloaded cassette, is effected at stations inside the machine that are in the dark. This is done with the aid of mechanical means that operate, one timed with the other, without the operator having to take any direct action.

The same applicant as herein has already built a machine of the type stated, forming the subject of U.S. Pat. No. 4,049,142, which envisages there being one light proof operating station and devices that make it possible to ascertain the dimensions, namely the length and breadth, of the cassettes as they are inserted into the machine and come to rest against two abutment elements. One such element is placed at the end and the other at the side of a transportation surface that enables the individual X ray film cassettes to be carried into the inside of the machine. Once the unloading of the exposed film has been effected and a new film has been reloaded into the cassette, the reloaded cassette is ejected from the machine.

Furthermore, the machine comprises a magazine for the films to be utilized in the reloading of the X ray cassettes that consists of a number of film containment drawers suitable to hold films of various formats so that the machine may have the widest usage versatility.

The magazine is located above an operating station where the insertion and the discharge of the X ray film cassette into the from the machine takes place. The drawers are in a fixed position and are placed, at different levels, one above the other.

The conventional machine also comprises devices for withdrawing the individual films from the magazine, placed in the region of each of the drawers and for ascertainment the dimensions of the cassette inserted in the machine. During the operations of reloading an X ray film cassette, only those at points corresponding to the drawer holding films of a format corresponding to that of the cassette are operated.

The machine is also provided with other operating devices that attend, in time with the above described operations, to the opening of the cassette, to the lifting up of the cover thereof, to the removal of the exposed film contained therein, and to the subsequent despatch of the film to transfer devices connected to an apparatus for developing the films.

The whole path the exposed film has to follow in order to arrive at the developing apparatus is in surroundings devoid of light.

As stated, the film magazine is placed at a level higher than that of the cassette inserted in the machine.

To channel the films towards the cassette inserted in the machine as the former are withdrawn from the drawers of the magazine, known machines are provided, in the region of each film containment drawer, with roller or belt conveyor devices. These devices send the films towards manifolds located downstream of the conveyor devices with respect to the magazine. The number of the manifolds corresponds to that of the drawers provided in the magazine. The inlet of each manifold is at a point corresponding to one of the drawers, and the outlets are grouped together and pointing towards the area where the X ray film cassette is waiting ready to be reloaded.

The films, as they are withdrawn from the drawers of the magazine to suit the format of the X ray cassette inserted in the machine, reach the position for entry into the said cassette by sliding freely in the inside of the manifolds.

Upon completion of the operations of reloading the cassette, machines of the type stated are provided with devices that cause the cassette to be closed automatically either immediately prior to or during the transfer of the cassette to the outside of the machine. Although machines constructed in this way do allow notable progress to be made technically compared with the time when all the aforementioned operations were entrusted to an operator who had to work in a darkroom, they present certain problems. One such problem is the need to have a somewhat complicated manifold system for transferring the films from the magazine to the area where the X ray cassette to be reloaded is located. This system includes a number of individual manifolds, each of which has to be positioned with precision at a point corresponding to one particular drawer of the magazine. The system does not allow easy inspection on the part of the operator should blockages occur in the running cycle of the machine because of the incorrect entry of the films therein.

Each manifold is, in fact, constituted by a substantially box-shaped body of an area nearly the same as but slightly greater than that of the individual films that have to slide in the inside thereof. Thus it is extremely difficult to take manual action to remove a film in the event of one getting locked therein.

SUMMARY OF THE INVENTION

The main object of the invention is to overcome the difficulties outlined above and, in particular, to make available an automatic machine for unloading and reloading films from and into X ray cassettes, wherein the transfer of each individual film from the magazine towards the area where the X ray cassette is open ready to be reloaded is achieved through the use of one single hopper for guiding the films. The hopper is so constructed as to contain only the edges of two opposite sides of the films as they are withdrawn from the magazine, and in such a way as to adapt itself automatically to the breadth of the films as they are withdrawn from the magazine to suit the breadth of the X-ray cassette inserted in the machine.

Another object of the invention is to make available a machine of the stated type, where in the guide hopper is automatically monitored. When suitable instructions are given by detection devices linked to the devices that permit the withdrawal of the individual films from the magazine, sheets or films different from the ones that can be utilized for reloading the X ray cassette are rejected.

A further object of the invention is to make available a machine of the stated type, wherein, because of the adoption of one single guide hopper able to adapt itself automatically to the breadth of the films as they are withdrawn from the magazine, it is possible to use a movable magazine. The magazine comprises a number of drawer placed one above the other, that can be positioned, compatibly with the format of the X ray cassette to be reloaded, in the region of one single device for the withdrawal of the films from the drawers. Such device is placed in between the magazine and the guide hopper, and thus eliminates the need to have the same number of film withdrawal devices as there are drawers in the magazine.

The objects are all attained with the machine forming the subject of the invention. The machine comprises one operating station at which there are devices for inserting the X ray film cassettes, one at a time, into the inside of the machine and for ejecting the reloaded cassettes from the machine, as well as at least one pusher device. The push device is movable in a substantially horizontal plane, perpendicularly to the entry and exit direction of the cassettes into and out of the machine. The pusher device is so placed as to come into lateral contact with the cassettes inserted in the machine and is able to carry them to rest up against an abutment element placed at the side of the means of conveyance on which the cassettes rest. The machine also comprises a magazine for new films of various formats, placed above the operating station and comprising a plurality of drawers arranged at different levels, one above the other. Each drawer is suitable for containing a pack of films of one particular format and the contents of each are different. First means of withdrawal is positioned in the region of the magazine, for withdrawing from the drawers a new film to suit the format of the cassette inserted in the machine, as ascertained by first and second detector means. The first detector means is tripped by the pusher device and the second by the thrusting of the cassette against the abutment element. The essential features of the machine includes a hopper for guiding the films which, when withdrawn from the said magazine, drop down freely towards the X ray cassette. The hopper comprises two elements for guiding each individual film, placed one opposite the other so as to form two channels for the containment and the free sliding motion of the edges of two opposite sides of the films. The first element is fixed and placed on the same side of the machine as the abutment element, and the second is supported in a sliding fashion by the frame of the machine so that it can undergo, in the direction of the fixed guide element, a two way displacement. Specifically, the second element is connected rigidly to the pusher device so as to be movable therewith in the direction of the first guide element.

In the event that the magazine is fixed, the machine is characterized in that guide elements are specular and have, from the top downwards, a first substantially L shaped section of almost the same height as that of the magazine and a second substantially U shaped section that extends downwards from the lower base of the magazine and has the parallel walls of one guide element projecting towards the parallel walls of the other guide element. These walls, when viewed laterally, extend downwards in such a way as to converge and progressively decrease the width of the channel formed between them. The machine also comprises a third section, also substantially of U shape, adjacent to the second section and pointing towards the area where the X ray cassette to be loaded is waiting. This section has parallel walls spaced apart to an extent slightly greater than the gage of the individual films utilizable for the reloading of the X ray cassettes.

Yet another characteristic of the machine forming the subject of the invention stems from the fact that the magazine for new films comprises a number of identical film containment drawers, placed at different levels one on top of the other. Each drawer rests on one particular carriage able to slide two ways in the direction of one single device for withdrawing the films from the various drawers, interposed in between the magazine and the guide hopper. The carriages rest on corresponding guides rigidly supported by a structure that slides vertically, in two directions, on guides fixed to the frame of the machine. The structure is provided with a feeler member located on the line that links the tripping elements of a number of level signalling microswitches that are placed one above the other. The microswitches are interspaced at a distance equivalent to that between the support surfaces of the drawers on their respective carriages. The microswitches are connected to the supply circuit of a geared motor, by which first the upward, then the downward motion of the structure, and subsequently that of the whole magazine, is effected. The microswitches are also connected to the devices that ascertain the format of the cassette inserted in the machine. This makes it possible to halt the upward movement of the magazine when the feeler member reaches the position in which it actuates the tripping element of the level signalling microswitch corresponding to the drawer containing films of a desired format. Such format conforms to that ascertained necessary for the X ray cassette for which the positioning of the drawer in the region of the means for the withdrawal of a film has been effected.

According to this solution, the elements that form the hopper for guiding the films are of a semi box shape that is substantially a U when viewed in sectional form, with parallel walls that project towards one another. Seen from the side, the walls extend downwards in a way whereby one converges with the other until a lower terminal section of the guide elements is reached. There they are spaced apart at a distance slightly greater than the gage of the individual films. The upper part of the guide elements is located near the device for the withdrawal of the individual films from the magazine, while the lower terminal section is turned towards the area where the open X ray cassette is waiting to be reloaded.

A further but not the final characteristic of the machine forming the subject of the invention comes from the fact that the elements that form the hopper for guiding the films are provided intermediately, and at the same level, with a section inclinable with respect to the directrix followed by each individual film as it drops down freely from the magazine towards the X ray cassette. This makes it possible to close the channels concerned for guiding the films towards the area where the X ray cassette to be reloaded is positioned, and to open a duct for the discharge of the films outside the area where the X ray cassette to be reloaded is located.

The invention has many advantages. The provision of a hopper for guiding the new films as they are withdrawn from the magazine makes it possible to do away with the system of manifolds as adopted today in known machines of this kind. This enables greater machine construction simplicity and overcomes the difficulties to which prior reference has been made regarding the impossibility of having rapid access to the inside of the manifolds in order to remedy eventual film blockage causes during the free running stage towards the area where the X ray cassette to be reloaded is located.

If the machine has a fixed magazine, the upper part of the said elements that form the guide hopper is advantageously shaped in such a way that it is able to receive the films withdrawn from the various drawers without the provision of a plurality of guide elements with which to channel the films towards the X ray cassette.

Adjusting the position, one with respect to the other, of the elements that form the guide hopper compatibly with the breadth of the X ray cassette to be reloaded, makes it possible to render the magazine for the new films movable and to use one single device for the withdrawal of the films. This facilitates greater simplicity and economy in the construction of the machine.

BRIEF DESCRIPTION OF THE DRAWINGS

The characteristics of the machine forming the subject of the invention will now be described more amply below with reference to a number of preferred but not sole forms of embodiment illustrated on the accompanying drawings purely as unlimited examples, in which.

DESCRIPTION OF THE PREFERRED EMBODIMENTS

Figure 1:
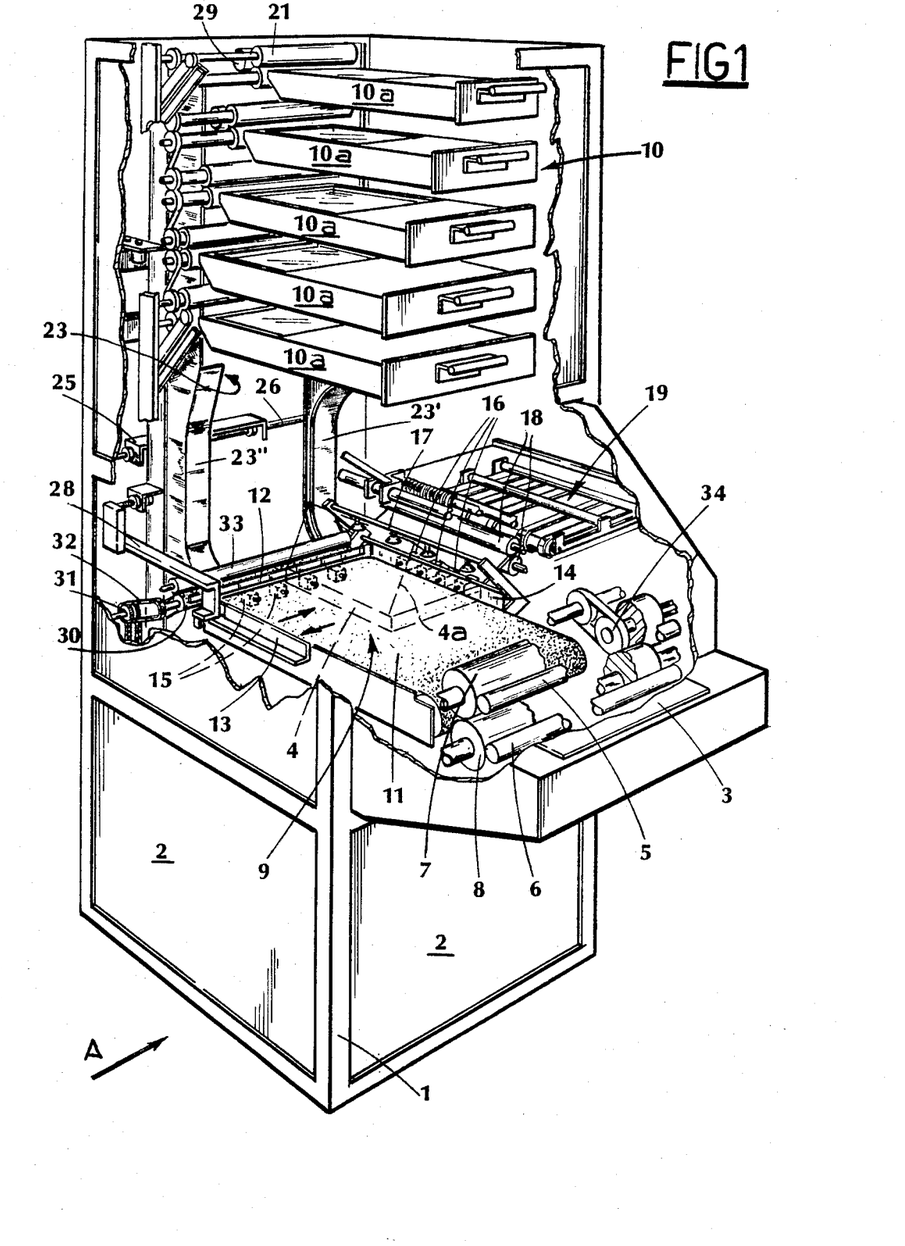
FIG. 1 shows the machine forming the subject of the invention in a comprehensive diagrammatic view, with emphasis being given therein solely to the main operating subassemblies referred to a first possible form of embodiment.

With particular reference to FIG. 1, shown at 1 is the frame of the machine and this can be seen to be closed in by means of the light proof panels 2. The machine is provided at the front with a surface 3 for the insertion therein of individual X ray film cassettes, such as the one shown in broken outline at 4, containing exposed films, and for the removal of the reloaded X ray cassettes exiting from the machine.

A pair of counter rotating, soft rubber, driven rollers 5 and 6 have the task of inserting and ejecting the individual X ray cassettes 4 into and from the machine. A pair of idle rollers 7 and 8 ensure, during the insertion and ejection stages, through perfect adherence to the external profile of the cassette, that there be no infiltration of light into the inside of the machine.

At 9 there is an operating station at which the following operations take place;

the format of the X ray cassette 4 inserted in the machine is ascertained;

after a lid locking lever 4b has been raised, the lid 4a is lifted up and the X ray cassette 4 is opened;

the exposed film contained in the X ray cassette 4 is withdrawn and is sent to an apparatus to be developed;

a new film of a suitable format, withdrawn from a magazine 10 located above the operating station 9, is inserted into the X ray cassette 4;

the lid 4a is lowered and the X ray cassette 4, reloaded, is ejected and, contemporaneously, the lid 4a is locked through the locking lever being moved.

All the above mentioned operations are effected by devices that come into action automatically, one in time with the other, under the control of a cyclic shaft with which the machine is provided. These devices do not form the subject of the invention and are thus not described in detail. In this text, only a brief description is given of the devices that enable the format of the X ray cassette 4 to be ascertained, and of how the operations listed above take place in succession.

Placed at the operating station 9 there is a continuous conveyor 11 that receives the X ray cassettes 4 as they are inserted in the machine and accompanies them flush up against a first locator member 12, hereinafter called the front locator member, placed in the region of the rear part of the continuous conveyor 11.

The impact of a cassette 4 against the front locator member 12 is detected by a microswitch, not shown on the drawings, which halts the continuous conveyor 11 and sets in motion a pusher 13 which, at the commencement of an operating cycle, is positioned at the side of the continuous conveyor 11 (on the left when looking at FIG. 1). The pusher 13 is entrusted with the task of carrying the cassette 4, already flush up against the front locator member 12, into abutment with a second locator member 14, hereinafter called the lateral locator member, also placed at the side of the continuous conveyor 11 but on the opposite part to that where the pusher 13 is stationed. As the pusher 13 moves forward it trips, one at a time, a number of microswitches 15 positioned in the region of the extreme rear of the continuous conveyor 11, each of which makes it possible to ascertain, with respect to the lateral locator member 14, the breadth of an X ray cassette 4.

Once the X ray cassette 4 arrives flush up against the lateral locator member 14, a non-illustrated microswitch halts the pusher 13, while a number of microswitches 16, which in the case described are supported by the lateral locator member 14 but can, in actual practice, be connected to the pusher 13, enable, depending on the number tripped, the length of an X ray cassette 4 to be ascertained.

Upon completion of this operation of ascertaining the format of an X ray cassette 4, the latter is opened and the lid 4a thereof is raised into the position shown with dashes in FIG. 1. The film contained in the cassette is then withdrawn by a device provided with suction pads, shown generally at 17, and is carried between a pair of counter rotating, driven, rollers 18 that send it to an outgoing conveyor 19 connected to an apparatus (not shown on the drawings) for developing the X ray films.

Compatibly with the format of the X ray cassette 4 ascertained by means of the microswitches 15 and 16, the withdrawal takes place of a new film from one of a number of drawers 10a with which the magazine 10 is provided, and then the insertion of the film into the X ray cassette 4 to be reloaded.

Following this the lid 4a of the X ray cassette 4 is automatically lowered so that it rests on the cassette, and subsequently the continuous conveyor 11, which attends to sending the cassette towards the rollers 7-8 and 5-6 and thence towards the exit of the machine, is set in motion.

The closing of the reloaded X ray cassette is entrusted to one or more devices provided with rollers, such as the one shown at 34 in FIG. 1, coaxial with the roller 7 and able to press on the lever 4b for locking the lid 4a in the sealed position on the cassette 4.

In a first embodiment of the machine forming the subject of the invention, the films, as they are withdrawn from the magazine 10, are guided towards the X ray cassette 4 waiting at the operating station 9. Specific reference is made to FIGS. 1, 2 and 3.

As has already been stated, the magazine 10 is provided with a number of film containment drawers 10a. The latter are placed one above the other, are in a fixed position and are aligned vertically in the region of the side of the machine where the lateral locator member 14 is positioned.

In the region of each drawer 10a (see FIG. 2) there is a device provided with suction pads, of a known type shown diagrammatically at 20, movable at determinate times from a position in which the suction pads fish a film 22 out of the drawer 10a concerned to one in which the front edge of the film 22 withdrawn is carried into the grip of a pair of counter rotating, driven, rollers 21 which transfer the film into the inside of a guide hopper 23 that is described below.

Figure 2:
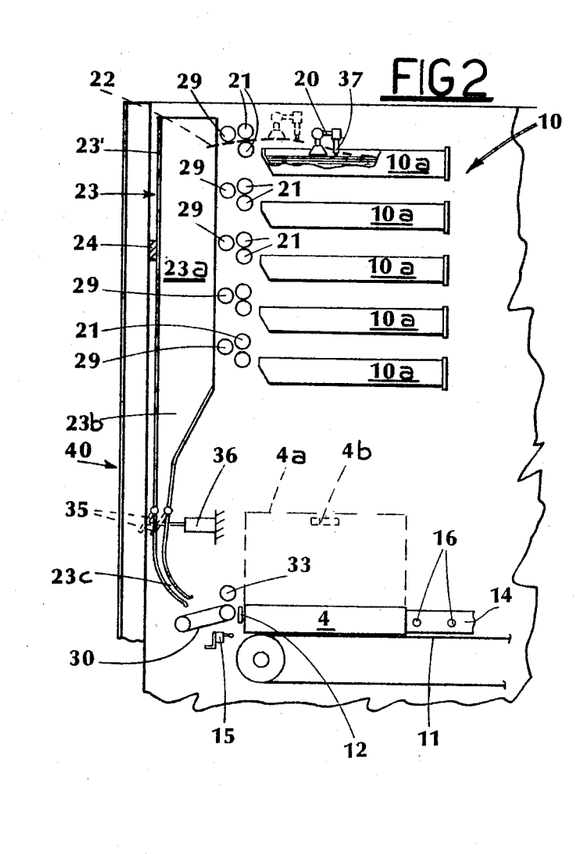
FIG. 2 shows, diagrammatically, one subassembly of the machine in question, namely the hopper for guiding the films which, withdrawn from the fixed position magazine, are guided towards the X ray cassette waiting at the operating station where the unloading and reloading of the cassette takes place, with everything viewed from the side A of the machine, shown in FIG. 1, and with some parts in sectional form so that others may become more apparent.

The guide hopper 23 is formed by two elements 23' and 23" for guiding each individual film 22, the first of these, namely element 23', being in a fixed position, almost in alignment, in a vertical plane, with the lateral locator member 14, and the second, namely the element 23", connected to the pusher 13.

The first guide element 23' is fixed to a pair of cross members 24 belonging to the frame 1 of the machine, while the second guide element 23" is fixed to a carriage 25 that slides along a bar 26 that extends transversely to the machine and is fixed to the frame 1. The vertical stability of the guide element 23" is ensured by a pair of idle rollers 27 (only one of which can be seen in FIG. 3), the axes of which are parallel one with the other, vertical, and supported by the guide element 23' in such a way as to have the rollers 27 adhering to the opposite surfaces of one of the cross members 24.

Figure 3:
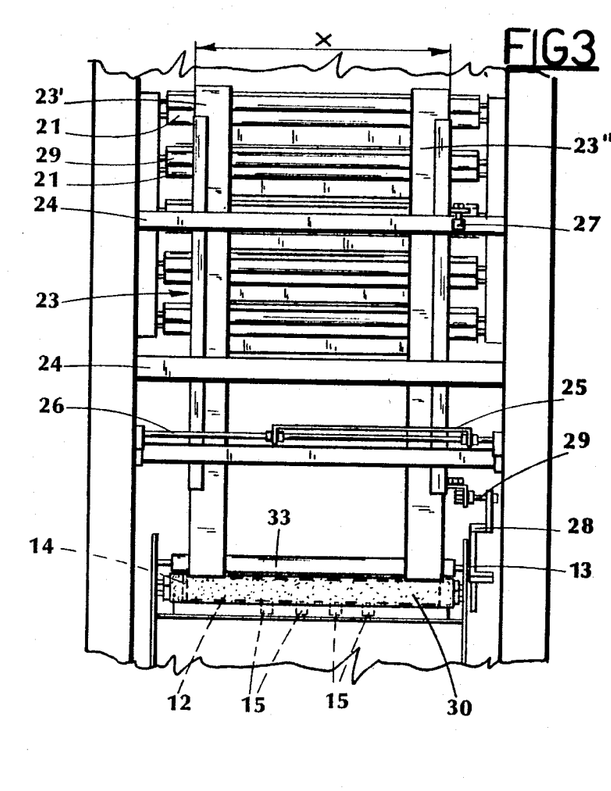
FIG. 3 shows, diagrammatically, the structure of FIG. 2, seen from the rear of the machine.

The guide element 23" is connected to the pusher 13 through an arm 28 secured to the latter and connected to the guide element by means of a screw 29 onto which is inserted by being twisted round and round a pair of nuts 30 which enable, at the time the machine is being set up, the position of the guide element 23" to be adjusted with respect to the pusher 13 and with respect to the first guide element 23'. The guide element 23" is thus movable with the pusher 13 in the direction of the first guide element 23', and it ensues, therefore, that depending upon the position adopted by the pusher 13 at the end of the stage in which an X ray cassette 4 inserted in the machine is carried flush up against the lateral locator member 14, the guide element 23" is automatically positioned, with respect to the first guide element 23', at a distance "x" that depends on the format of the cassette 4.

In accordance with the solution shown in FIGS. 1, 2 and 3, the guide elements 23' and 23" are formed by semi box shaped elements that face one another and each have from the top downwards: a first substantially L shaped section 23a of a height almost identical to that of the magazine 10; a second substantially U shaped section 23b that extends downwards, starting from the lower base of the magazine 10 and has parallel walls that converge, one with the other, towards the lower part (see FIG. 2); and a third section 23c, also substantially of U shape, the conformation of which is such as to have the outlet thereof turned towards the X ray cassette 4 waiting at the operating station 9, and the parallel walls of which are adjacent to those of the second section 23b, inter-spaced at a distance a little greater than the gage of each individual film 22.

This particular conformation of the guide elements 23' and 23" makes possible the use of one single hopper 23 for guiding the films 22 withdrawn from any one of the drawers 10a of the magazine 10 towards the X ray cassette 4 to be reloaded. Each individual film 22 leaving the rollers 21 of the drawer 10a concerned has every possibility of dropping into the guide hopper 23 and of being guided perfectly on both sides at the time it is descending towards the X ray cassette 4, and this is because the second guide element 23" is positioned automatically with respect to the first guide element 23' to suit the format of the X ray cassette 4 and thus that of the new film 22 to be inserted therein.

In order to assist the insertion of each individual film 22 in the hopper 23, in conjunction with each pair of rollers 21 there is a third roller 29 that idles downstream of the former, the lower generatrix of the latter being placed at a level lower than the corresponding generatrix of the upper roller of the pair of rollers 21. In this way, the films 22 entering the guide hopper 23 are oriented downwards, thus making it easier to thread them through the sections 23a and 23b of the guide elements 23' and 23".

Each individual film 22 leaving the guide hopper 23 drops into a resting position on a belt conveyor shown diagrammatically at 30 in FIGS. 1 and 2. The conveyor 30 is driven, through a mechanical linkage system, by a drive shaft 31 onto which are keyed one or more drive pulleys 32. Above the belt conveyor 30 is placed a drive roller 33 that is given a rotatory motion in a complementary direction to that in which the belt conveyor moves. The roller 33, in cooperation with the belt conveyor 30, transfers the individual films 22 exiting from the hopper 23 to the inside of the X ray cassette 4 to be reloaded that is waiting at the operating station 9.

The suction pad devices 20 that enable new films 22 to be withdrawn from the magazine 10 can all either be driven by one single drive device or else be driven individually: in either case, during the operation of reloading an X ray cassette inserted in the operating station 9, only the device 20 related to the drawer 10a containing films of a format matching that of the X ray cassette 4, as ascertained by the microswitches 15 and 16, will be brought into use.

Figure 4:
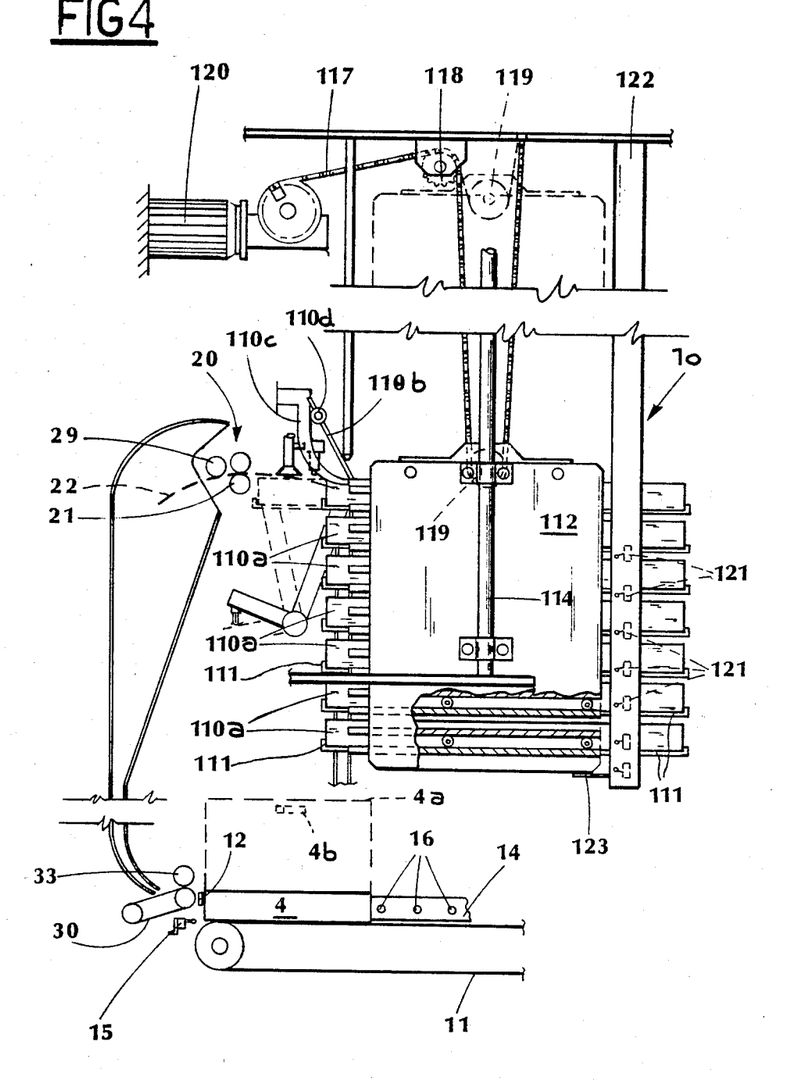
FIGS. 4 and 4a show, partially and diagrammatically, the machine in question in the version that envisages the magazine movable vertically and the use of one single device for the withdrawal of the films from the magazine.
Figures 4A, 5:
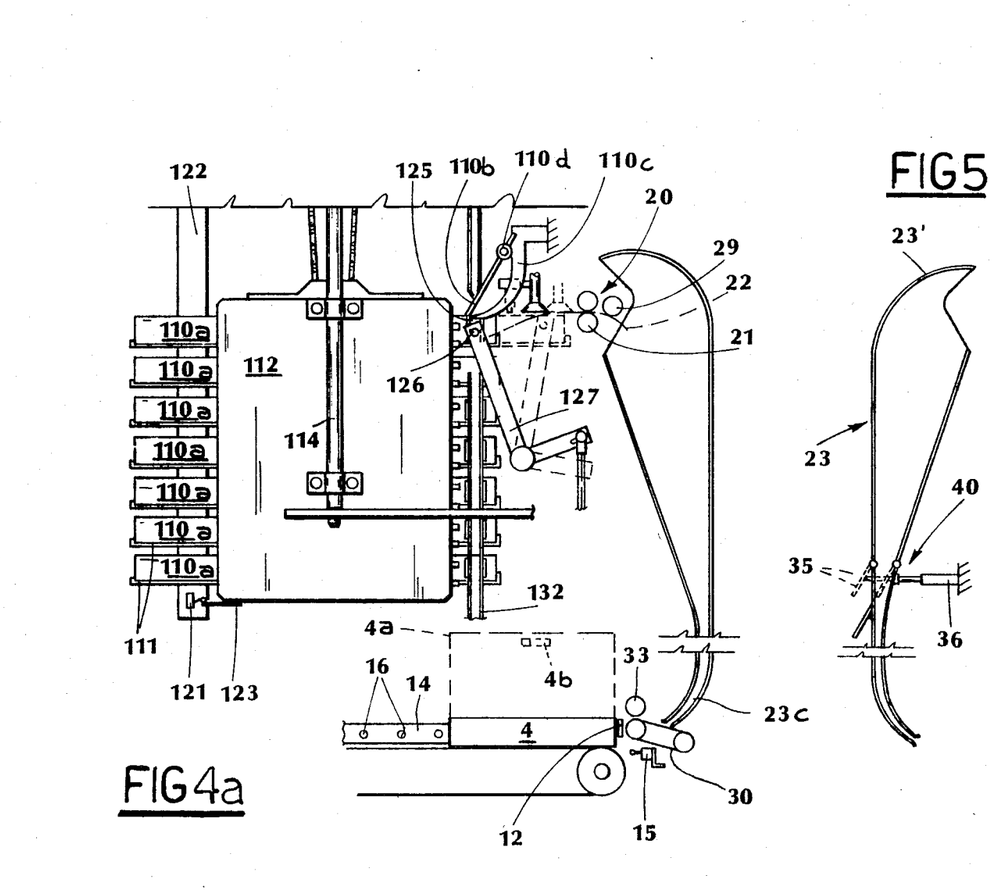
FIG. 5 shows, diagrammatically, a first possible alternative form of embodiment for the hopper that guides the films withdrawn from the magazine, though solely as regards the devices that make it possible to deviate the path of the films to the outside of the guide hopper prior to their arriving at the X ray cassette.

FIGS. 4 and 4a show a second embodiment of the machine forming the subject of the invention. This embodiment differs from what has been described previously in that the magazine for new films 22, instead of being fixed, is movable vertically in such a way that the various drawers containing films of different formats can be carried, one at a time, into the region of one single device 20 for the withdrawal of the films from the magazine, placed in front of the entrance to the hopper 23.

The magazine 10 is formed by a number of film containment drawers 110a placed at different levels, one above the other, and each provided with a cover 110b. Each drawer 110a rests on a carriage 111 supported bilaterally by guides fixed to a structure 112 in a way whereby it is able to slide, with respect to the structure, just in the direction of the device 20.

The structure 112 is restrained in a sliding fashion by a pair of upright members 114 fixed to the frame of the machine.

As stated, the magazine 10 contains films of different formats. For this reason, the various drawers 110a are all aligned vertically on the side where the fixed guide element 23' of the hopper 23 and the lateral locator member 14 are located.

The drawers 110a have to be carried, one at a time, to the working height of the withdrawal device 20 compatibly with the format, ascertained by the microswitches 15 and 16, of the X ray cassette 4 inserted in the machine.

For this purpose, the structure 112 is coupled to a pair of chains 117 (one only of which can be seen in FIG. 4) mounted on gearwheels 118 and 119, the former supported by the frame of the machine and the latter keyed onto a shaft supported by the structure 112.

One extremity of the chains 117 is anchored to the frame of the machine, while the other extremity is coupled to pulleys keyed onto the output shaft of a geared motor 120 fixed to the frame of the machine.

Thus as a function of the direction of rotation of the shaft of the geared motor 120, upward or downward movement of the magazine 10 takes place and it is possible to carry the appropriate drawer 110a to the working height of the withdrawal device 20.

To halt the geared motor 120 once the required drawer 110a has reached the working height of the withdrawal device 20, provision is made for a number of level signalling microswitches 121 connected to the supply circuit of the geared motor 120 and linked to the microswitches 15 and 16 that ascertain the format of the X ray cassette 4 inserted in the machine.

The microswitches 121 are installed at different levels, one above the other, on a vertical bar 122 parallel to the upright members 114, and correspond numerically to the number of drawers 110a. Interspaced at a distance equal to that in between the support surfaces of the drawers 110a on the carriages 111, the microswitches 121 are also placed in a way in which they can be tripped by a feeler 123 fixed to the structure 112.

According to this solution, the machine in question is provided with one single device for carrying the drawers towards the device 20 and into the working position thereof. Each carriage 111 is provided (see FIG. 4a) with a groove 125 with which is free to engage a pin 126 pivotally connected to the upper extremity of a two arm lever 127, the middle part of which is pivoted to the frame of the machine.

The lever 127 is connected to cam control means, not illustrated on the drawings, and is made to oscillate around its own fulcrum on a time relationship basis with the other devices of the machine in such a way as to cause the displacement, in the direction of the device 20, of the carriage 111 on which rests the drawer 110a containing films of a format corresponding to that, ascertained by the microswitches 15 and 16, of the X ray cassette 4.

A vertical guide 132 is fixed to the frame of the machine. The grooves 125 constantly engage the guide 132 in a sliding fashion the grooves 125, when the carriages 111 are in the retracted position. The guide 132 is placed in the same plane as the pin 126, and in the region thereof there is a discontinuity in order to allow just the particular carriage 111 of the drawer 110a carried to the working height of the withdrawal device 20, to slide in the two permitted directions.

During the commencement of an operating cycle, the magazine 10 is in the maximum downward travel position.

Once the microswitches 15 and 16 have ascertained the format of the X ray cassette 4 inserted in the machine, the geared motor 120 is set in motion and the magazine 10 starts to move upwards.

The linkage between the microswitches 121 and the microswitches 15 and 16 is effected in such a way that only after the feeler 123 has tripped the microswitch 121 energized to suit the number of microswitches 15 and 16 tripped by the X ray cassette 4, is the geared motor 120 brought to a halt, with the halt corresponding. The drawer 110a containing films of the same format as that ascertained for the X ray cassette 4 is then positioned in the region of the working position of the withdrawal device 20.

When the drawer 110a is made to move forward towards the device 20, an idle pin 110d supported by the cover 110b intercepts a cam 110c fixed to the frame of the machine in proximity of the device 20, in such a way as to automatically bring about the opening of the drawer only when it is necessary to withdraw a film 22 therefrom.

In accordance with this solution, the guide elements 23' and 23" that form the guide hopper 23 are so conformed as to have over their full extension, a section of substantially U shape, and when seen from the side (see FIGS. 4 and 4a) the elements 23' and 23" have parallel walls forming the channel for guiding the lateral edges of the films 22. The walls converge, one with respect to the other, going from the top downwards until a terminal section is reached, namely section 23c, where the walls are interspaced at a distance slightly greater than the gage of the individual films 22.

According to one possible form of embodiment, the guide hopper 23 can be provided with a device 40 (FIGS. 2, 5 and 6) that enables the discharge to the outside of the said hopper of sheets or films different from the films 22 that can be utilized for reloading the X ray cassettes.

It does happen, in fact, that when a new pack of films 22 is inserted into the magazine 10, the cardboard sheet or the film placed to protect the pack of films 22 has to be eliminated.

This is because, in accordance with techniques now known, the wrappings in which the pack of films is contained, are opened by devices located in the inside of each drawer, with the drawer closed in order to avoid exposing the films to the light.

In accordance with the solutions illustrated in FIGS. 2 and 5, the guide elements 23' and 23" of the guide hopper 23 have a section 35 of their respective opposite walls that can be inclined with respect to the directrix followed by each individual film 22 as it drops down freely from the magazine 10 towards the X ray cassette 4 waiting at the operating station 9.

The sections 35 of the opposite walls of each element 23' and 23" are, in the case illustrated, pivotally connected at the top to the walls, and are connected in the middle to the rod of a pneumatically controlled piston that slides inside a cylinder 36 supported by the frame of the machine.

The operation of the piston is controlled by a sensor 37 linked to each device 20 for withdrawing the films 22 from the magazine 10, or to the one device 20 for the solution illustrated in FIGS. 4 and 4a. The sensor 37 can detect the presence of a sheet or of a film different from the films 22 at the time the devices or the device 20 is actuated to withdraw a required film 22 from the magazine 10.

The operation of the piston 31 causes the rod to project out of the cylinder and the consequential arrangement, as illustrated with dashes in FIGS. 2 and 5, of the sections 35 of the opposite walls of the guide elements 23' and 23". In this way, the sheet or film dropping down the guide hopper 23 is deviated to the outside of the hopper.

Figure 6:
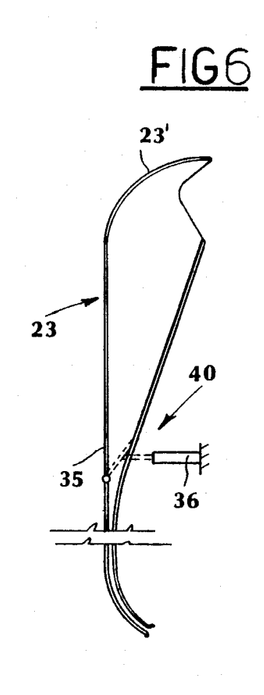
FIG. 6 shows, diagrammatically, a possible variant in respect of the form of embodiment for the devices as per FIG. 5.

In a possible variant, one only of the opposite walls of the guide elements 23' and 23", namely the outer wall, is provided, as illustrated in FIG. 6, with a section 35 inclinable for the above stated purpose. The section 35, in this particular case, is pivotally connected at the bottom to the wall, and the rod of the piston that slides inside the cylinder 36 is normally in the fully projecting position in such a way as to retract into the cylinder once, following the instruction given by the sensor 37, the piston is operated.

In this case, the section 35 can be arranged, as illustrated with dashes in FIG. 6, with the upper extremity thereof flush up against the opposite inner wall of the corresponding guide element 23' or 23" and with, at the same time, a channel being opened for the discharge to the outside of the sheet or film dropping down the hopper 23.

Obviously, in practice, all the above described elements may be replaced, without there being any deviation from the framework of protection afforded to the invention as claimed below, with other technically equivalent elements.

Furthermore, provision may be made for a signalling device able to advise the operator of the operation of the device 40 in order that action may be taken by the operator to re-insert the particular cassette 4 that is about to leave the machine minus the film with which it should have but has not been reloaded during the operating cycle due to the sheet or film protecting the pack of films 22 placed in the magazine 10 having been discharged to the outside of the guide hopper 23.

What is claimed is:

1. In an automatic machine for unloading and reloading films from and into X ray cassettes, comprising, at an operating station, means for inserting the cassettes, one at a time, into the inside of the machine, for conveying the cassettes within the machine, and for ejecting the reloaded cassettes from the machine, an abutment element placed at the side of the means of conveyance of the cassettes, at least one pusher device movable, in a substantially horizontal plane, perpendicularly to the forward movement direction of the cassettes in such a way as to come into lateral contact therewith and able to carry them to rest up against said abutment element a magazine for new films of various formats, placed above said operating station and including a plurality of drawers arranged at different levels, one above the other, each suitable for containing a pack of films of one particular format and the contents of each being different, first and second detector means, the former tripped by said pusher and the latter by the thrusting of the cassette against said abutment element, withdrawal means, positioned in the region of said magazine, for withdrawing from said drawers a film to suit the format of the cassette inserted in the machine, as ascertained by said first and second detector means, and transfer means placed in the region of the said operating station in order to transfer said film withdrawn from the magazine into the cassette at said operating station, the improvement comprising a hopper for guiding the films which, when withdrawn from said magazine, drop down freely towards the X ray cassette, said hopper comprising two elements for guiding each individual film, placed one opposite the other and defining two channels for the containment and the sliding motion of the edges of two opposite sides of the films, a first element being fixed and positioned on the same side of the machine as the abutment element, and the second supported in a sliding fashion by the machine in a way whereby it is able to undergo, in the direction of the fixed guide element, a two way displacement, connected rigidly to said pusher device so as to be movable therewith in the direction of the first guide element.

2. An automatic machine according to claim 1 wherein said guide elements are provided, at least in the region of the terminal part thereof, with a substantially U shaped cross section pointing towards said second means for gripping and transferring the films as they are withdrawn from the magazine, the parallel walls of said guide elements being interspaced, at said section, at a distance slightly greater than the gage of each individual film.

3. Automatic machine according to claim 1 of the type in which said magazine is fixed and comprises a plurality of drawers placed one above the other, and wherein said guide elements are specular and have from the top downwards: a first substantially L shaped section of almost the same height as that of the magazine; a second section substantially of U shape that extends downwards starting from the lower base of the magazine and has parallel walls that form channels for guiding the films extending downwards in such a way as to converge so as to progressively decrease the width of the channel formed by them; and a third section, also substantially of U shape, pointing towards said second means for gripping and transferring the films, the parallel walls of which are interspaced at a distance slightly greater than the gage of said films.

4. Automatic machine according to claim 1 wherein said magazine comprises a number of film containment drawers, placed at different levels one above the other, a separate carriage supporting each drawer and able to slide two ways in the direction of one single device for withdrawing the films from the various drawers, interposed in between said magazine and said guide hopper; bilateral guides supporting said carriages for vertical movement in two directions, a plurality of level signalling microswitches that are placed one above the other, interspaced at a distance equivalent to that between the support surfaces of the said drawers on their respective carriages, a geared motor, a feeler member for tripping said microswitches, said microswitches being connected to control the upward and downward motion of said magazine, said microswitches also being connected to the devices that ascertain the format of the cassette inserted in the machine, in such a way as to halt the upward movement of the magazine when said feeler member trips the level signalling microswitch corresponding to the drawer containing films of a format matching that ascertained by said first and second detector means, with the drawer being positioned in the region of said first means for the withdrawal of a film from the magazine.

5. Automatic machine according to claim 4 wherein each drawer is provided with a cover hinged thereto, further comprising an idle pin supported by said cover, a cam fixed to the machine in a position such as to be intercepted by said idle pin, in such a way as to open the drawer as it moves towards the device for the withdrawal of films from the magazine.

6. Automatic machine according to claim 1 or 4 wherein the guide elements that form the hopper for guiding the films are specular, substantially U shaped in cross section, and have parallel walls forming the channels in which the lateral edges of the films withdrawn from the magazine slide, said walls extending downwards in such a way as to converge, one with respect to the other, until a lower terminal section of said guide elements is reached where they are spaced apart at a distance slightly greater than the gage of the individual films.

7. Automatic machine according to claim 1, 2, 3 or 4 wherein said guide elements that form the hopper for guiding the films have a section inclinable with respect to the directrix followed by each individual film as it drops down freely in the inside of the guide hopper, in order to deviate the path of said films to the outside of the hopper prior to arriving at the operating station where the X ray cassette is waiting to be reloaded.

8. Automatic machine according to claim 6 wherein said section inclinable with respect to the directrix followed by each individual film as it drops down freely in the inside of the guide hopper, is defined by two parts of the parallel walls of each guide elements that are situated at the same level, are pivoted at the top to said walls, further comprising one single drive device that causes their contemporaneous pivoting, in the same direction, around their respective pivot axes, in a way whereby one of them is carried into an inclined position in which it closes the guide channel in which the individual films slide, and the other into a position in which it opens the mouth of a channel for discharging the films, with the section of the wall that closes said guide channel turned towards said mouth.

9. Automatic machine according to claim 6 wherein said section inclinable with respect to the directrix followed by each individual film as it drops down freely in the inside of the hopper, is defined by one part of each of the outer walls of the two guide elements that form the channel for guiding the films, said sections being pivotally connected at the bottom to the wall concerned, further comprising a drive device, said sections being connected at the top to said drive device, said drive device causing their contemporaneous pivoting, in the same direction, around their respective pivot axes, in a way whereby the upper extremity of each is carried flush up against the opposite inner wall of the quide element to which it belongs.

10. Automatic machine according to claim 6 further comprising a drive device and sensors linked to the first means for the withdrawal of the individual films from the magazine and able to detect the presence of a sheet or film different from the films utilizable for the reloading of the X ray cassettes, wherein said inclinable section is subjected to the action of said drive device, the operation of which is controlled by said sensors.

11. Automatic machine according to claim 1, 3 or 4 further comprising suction pad devices, wherein said first means for the withdrawal of the individual films from the magazine comprise a pair of upper and lower counter rotating, driven, drive rollers able to receive a film withdrawn from the magazine by said suction pad devices, said suction pad devices being movable, in two directions, between said rollers and said magazine, further comprising a third roller placed idling downstream of said pair of rollers, at a level such that the lower generatrix thereof is at a level lower than the corresponding generatrix of the upper roller of the said pair of rollers, said rollers sending said film into the inside of said guide hopper.

12. Automatic machine according to claim 7 further comprising a drive device and sensors linked to the first means for the withdrawal of the individual films from the magazine and able to detect the presence of a sheet or film different from the films utilizable for the reloading of the X ray cassette, wherein said inclinable section is subjected to the action of said drive device, the operation of which is controlled by said sensors.

* * * * *